United States Patent Office 3,313,757
Patented Apr. 11, 1967

3,313,757
VINYLIDENE CHLORIDE-METHYL ACRYLATE-METHYL METHACRYLATE-ACRYLONITRILE COPOLYMER LATICES
Alex Trofimow, Brookline, Elizabeth C. Dearborn, Boston, and Norbert K. Mader, Wilmington, Mass., assignors to W. R. Grace & Co., Cambridge, Mass., a corporation of Connecticut
No Drawing. Filed Mar. 9, 1964, Ser. No. 350,602
9 Claims. (Cl. 260—29.6)

This invention relates to vinylidene chloride tetrapolymers and more particularly to latices of such tetrapolymers and to films deposited therefrom.

Polymerized vinylidene chloride latices capable of forming films are of particular importance in providing barrier films and coatings for packaging materials such as paperboard, glassine, and polyolefin films, particularly packaging materials for the food industry. The property of such latices which makes them so desirable as barrier layers is the impermeability of polymerized vinylidene chloride to moisture vapor transmission, oxygen transmission, and resistance to grease and oil penetration. However, unmodified polymerized vinylidene chloride alone is inferior for such barrier uses because it forms a weak and brittle layer. In order to provide suitable films or coatings having high moisture vapor barrier characteristics while at the same time providing the necessary strength and flexibility, vinylidene chloride has been polymerized with various polymerizable organic compounds as comonomers.

A particularly useful vinylidene chloride copolymer is one having a high proportion of vinylidene chloride and relatively small amounts of methyl acrylate and acrylonitrile as the comonomers. Such copolymer latices are generally evaluated on the basis of three properties of the free film or coating formed from such latices: flexibility, degree of blocking (adherence of the copolymer layer to another layer), and the moisture vapor transmission rate (MVTR). In the past, in order to improve the MVTR, as high as possible a proportion of vinylidene chloride would be utilized. However, this introduced an increasing degree of brittleness into the film or coating. It would also be desirable to use as much of each of the other comonomers as possible in order to provide the flexibility characteristics of one and the reduced tendency to block of the other; however, the other comonomers generally have an adverse effect on the MVTR.

By means of the present invention vinylidene chloride copolymer latices have been prepared by the polymerization of a four-monomer system to provide coatings or films which possess an improved combination and balance of flexibility, nonblocking, and MVTR characteristics. Vinylidene chloride tetrapolymer latices of this invention provide, in a single coating, barrier characteristics superior to single coatings of terpolymers, at the same total solids.

The novel vinylidene chloride copolymers of the present invention comprise a predominant amount of vinylidene chloride and relatively minor amounts of methyl acrylate, methyl methacrylate, and acrylonitrile. It has been found unexpectedly that the methyl methacrylate can act as a plasticizing comonomer while at the same time provide an increased degree of hardness to the copolymers which improves the blocking of the films. Inclusion of methyl methacrylate permits reduction of vinylidene chloride to levels lower than those used in the prior art without a substantial adverse effect on the MVTR. Any deleterious effect which the presence of methyl methacrylate may have on scoreability of the films may be compensated for by decreasing the vinylidene chloride. There is also a decreased tendency to cross-link in films containing methyl methacrylate which thereby contributes to the improved MVTR and scoreability of the films.

The novel latices of the present invention comprise copolymers having from 80 to 94 percent vinylidene chloride, 1.5 to 15 percent methyl methacrylate, 1.5 to 15 percent methyl acrylate, and 1 to 10 percent acrylonitrile. It should be understood that all the formulations set forth in the present invention represent the weight percent of the monomer charge. The preferred latices, i.e., those which provide films which possess the optimum combination of properties, comprise 88 to 92 percent vinylidene chloride, 1.5 to 6 percent methyl methacrylate, 4 to 7 percent methyl acrylate, and 2 percent acrylonitrile. Particularly preferred are two compositions which comprise vinylidene chloride, methyl methacrylate, methyl acrylate, and acrylonitrile in the ratio of $$89:4.5:4.5:2$$

and 91:5:2:2 respectively.

The above-described beneficial and unexpected effects of the introduction of methyl methacrylate into the copolymer system may be illustrated by the following comparison. A film of a copolymer comprising 88 percent vinylidene chloride, 10 percent methyl acrylate, and 2 percent acrylonitrile possesses good flexibility but has a MVTR of about 0.45 at 60 percent total solids and a blocking value of 3. A comparable film prepared from a copolymer latex of the present invention comprising 88 percent vinylidene chloride, 5 percent methyl acrylate, 5 percent methyl methacrylate, and 2 percent acrylonitrile shows the same degree of scoreability and flexibility as the former film prepared from the terpolymer, a reduced tendency to block, and an MVTR of about 0.30 to 0.35 at 60 percent total solids.

The following test procedures were used to determine scoreability and blocking of the latex coatings and films.

Score test procedure.—Latex coatings were made on paperboard (International Paper Company Moss Cote 15-point board having a clay-coated surface) using a No. 16 Mayer rod and at a coating weight of 14 to 16 pounds per ream (3000 square feet). The coating was immediately dried in a forced-air oven at 120° C. for 20 seconds. The coated board was then cut into strips approximately 10 inches by 3½ inches, aged, scored, and dyed.

The samples were normally aged at 75° F., and 50 percent relative humidity. Accelerated aging studies were carried out at 122° F. in a forced-air oven with 24-hour preconditioning at 75° F. and 50 percent relative humidity before scoring.

The Boxboard Research and Development Association Bending Tester (Lyon Machinery Builders, Kalamazoo, Mich.) was used for all score tests. This instrument is essentially a hydraulic press equipped with a scoring die. The male die in the series used is 0.028 inch, and the six female dies varied from 0.054 inch to 0.094 inch in width with no penetration of the scoring rule into the female die.

The coated surfaces were then painted with a Congo red dye solution containing a slight amount of emulsifier to aid wetting. The dye was immediately rinsed off with running water. Dye was visible only on those lines where the film had failed.

Samples were evaluated on the basis of relative breakdown. A sample which showed just enough breakdown to cause dye penetration through the film over all of the male and female scores was arbitrarily given a value of 5, and a sample showing no penetration was arbitrarily given a value of zero. Intermediate degrees of dye penetration were assigned values between 0 and 5.

*Blocking test procedure.* — The latex coatings were made with No. 16 Mayer rod (on the clay coated surface of International Paper Company Moss Cote paperboard) at a coating weight of 14 to 16 pounds per ream (3000 square feet) and dried at 120° C. for 20 seconds. One-inch squares were cut with a dye from the coated as well as the uncoated board and stacked under a pressure of 500 grams per square inch for three hours at 50° C. in a forced-air oven. The samples were allowed to cool to room temperature and were then separated.

Evaluations as to the degree of blocking was based on the following criteria:

| Rating | Blocking Resistance | Criteria |
| --- | --- | --- |
| 1 | No blocking | No adhesion or cohesion between contiguous surfaces, which slide freely upon another. No marring of surfaces. |
| 2 | Very slight blocking | Slight adhesion, adjacent surfaces do not slide freely, but will with frictional pressure. Surface shows no obvious signs of marring. |
| 3 | Slight blocking | Same as above but shows slight surface marring. |
| 4 | Considerable blocking | Adhesion or cohesion of contiguous surfaces, layers may be separated with difficulty. Surfaces may be marred or partially destroyed. |
| 5 | Complete blocking | Blocking to the extent of a complete seal or weld between adjacent surfaces which cannot be separated without destruction of the test specimen. |

The moisture vapor transmission rate of the films formed from latices of the present invention was determined in the following manner. The latex was coated by a single pass on a Moss Cote (clay-coated board) using a No. 16 Mayer rod and a coating weight of 14 to 16 pounds per ream (3000 square feet). The coated samples were immediately dried in a circulated air oven at 120° C. for 20 seconds. Sufficient desiccant to cover the bottom evenly was placed in a clean test dish of the type illustrated in TAPPI Standards, T464m—45. The test specimen was cut with a die to a size to fit snugly into the flange on the test dish. The specimen was placed in position in the test cup with the coated side up, and steel template was centered on the specimen. Molten wax was allowed to flow into the annular space between the template and the flange thereby providing a moisture tight seal between the edge of the specimen and the test dish. The wax allowed to harden, and the template was removed. The test dishes with the specimens were placed into a 100° F. forced air oven at 90 percent relative humidity. The test dishes were removed from the oven and weighed after every 24 hours of successive exposure until the moisture gain of the test dishes reached a constant weight. All samples were run in triplicate with a known sample as a control for each group of tests. The MVTR is reported as moisture pick-up in grams of water per 24 hours per hundred square inches at 100° F. and 90 percent relative humidity.

The properties of compositions within the scope of the present invention are set forth in the following table:

| Monomer Composition Weight percent | | | | Scoreability | | | | | Blocking | MVTR 60% Total Solids |
| --- | --- | --- | --- | --- | --- | --- | --- | --- | --- | --- |
| Vinylidene Chloride | Methyl Acrylate | Methyl Methacrylate | Acrylonitrile | Hours | | | | | | |
| | | | | 1 | 3 | 6 | 8 | 24 | | |
| 87 | 5 | 5 | 3 | 2 | 2 | | | 2.5 | 2¼ | 0.35 |
| 87 | 3.5 | 3.5 | 6 | 4 | 3.5 | | | 2.5 | 2 | 0.47 |
| 88 | 5 | 5 | 2 | 1.0 | 1.0 | 1.5 | 1.5 | 1.5 | 2½ | 0.33 |
| 89 | 4.5 | 4.5 | 2 | 1 | 1.5 | 1.5 | | | 2½ | 0.34 |
| 90 | 4 | 4 | 2 | 1.5 | 1.5 | | | | 2½ | 0.30 |
| 91 | 4.5 | 1.5 | 3 | 1 | 2.5 | 3 | 3 | 3.5 | 2 | 0.20 |
| 91 | 3.5 | 3.5 | 2 | 1.5 | 2.5 | | | | 2¼ | 0.26 |
| 91 | 1.5 | 4.5 | 3 | 1 | 2.5 | 2.5 | 3 | 3 | 1¾ | 0.17 |
| 91 | 4 | 3 | 2 | 2 | 2 | 2.75 | 2.75 | | 2 | 0.24 |
| 91 | 5 | 2 | 2 | 1 | 2 | 2.5 | 2.5 | | 2 | 0.20 |
| 91 | 2.1 | 6.2 | 0.7 | 1 | 3.5 | 4 | 4 | 4 | 2 | 0.17 |
| 91 | 6.2 | 2.1 | 0.7 | | | | | | 3 | 0.17 |
| 91 | 4.5 | 1.5 | 3 | 1 | 3 | 3.5 | 3.5 | 3.5 | 2 | 0.25 |
| 92 | 3 | 3 | 2 | 2 | 3 | 3.5 | 3.5 | | 1½ | 0.15 |
| 94 | 2.5 | 2.5 | 1 | | | | | | 1 | |

The novel vinylidene chloride copolymer latices of the present invention may be prepared by a process wherein the constituent monomers are emulsified in water in a reaction zone in the presence of an emulsifying agent and polymerized through the agency of a water-soluble polymerization initiator. After an initial charge of monomer, emulsifier, and coupling agent, the monomers and emulsifying agent are added continuously to the reaction zone during the course of the reaction while maintaining the weight ratio of the added monomer to the emulsifying agent substantially constant and while maintaining the conversion of the monomers in the reaction zone above 80 weight percent at any time after initiation of the reaction. The initial charge of monomers contains the specific emulsifier content required for the desired micelle formation, and the remaining monomers are added continuously to maintain a predetermined pressure in the reactor. The polymerization is generally carried out to a 40 to 50 percent total solids.

At the end of the reaction period, the reactor is vacuum purged to remove unreacted monomers. A determination of the residual monomer content in the reaction has shown that the ratio of unreacted monomer is the same as the charge ratio. The latex may then be given one or more of several optional treatments, e.g., stripping, pH adjustment, or concentration to a high solids level. The reaction proceeds to 98+ percent completion.

As described above, the emulsifier is preferably added to the reactor with the monomer phase. It should be understood, however, that the emulsifier may also be added separately, if desired. However, by adding the emulsifier with the monomer phase, the ratio or emulsifying agent to monomer will remain constant. The mixture of monomers and emulsifying agent can be made merely by agitating the materials together and maintaining agitation or by adding an emulsifier coupling agent to prevent separation. Suitable coupling agents are acetic acid, glycerine, water, acrylic acid, methanol and wetting agents such as dioctyl sulfosuccinate (Aerosol OT). The coupling agents will normally be used in amounts of 0.1 to 4 weight percent based on the weight of the monomers.

The following nonlimiting examples illustrate the preparation of the novel latices of the present invention:

EXAMPLE 1

| Monomer phase: | Parts (by weight) |
|---|---|
| Vinylidene chloride | 91.0 |
| Methyl acrylate | 5.0 |
| Methylmethacrylate | 2.0 |
| Acrylonitrile | 2.0 |
| Acrylic Acid | 0.25 |
| Sodium dodecylbenzene sulfonate | 3.75 |
| Aqueous phase: | |
| Demineralized water | 140 |
| Catalyst: | |
| Hydrogen peroxide | 0.5 |
| Initiator phase: | |
| Ferric chloride | 0.002 |
| Demineralized water | 2.0 |

The aqueous phase was placed in the reactor, heated to 122° F. and then purged under 15 in. of vacuum for one hour. The monomers, emulsifier, and coupling agent were mixed and maintained at 38 to 40° F. The hydrogen peroxide was added to the aqueous phase, and the initial monomer charge was placed in the reactor (9% of the monomer phase). The addition of the initiator phase was then begun. The pressure in the reactor at this point was 13 p.s.i. which started to drop when polymerization was initiated. When the pressure fell to 8 p.s.i. additional monomer phase was added at a rate sufficient to maintain the pressure at 8 p.s.i. The temperature of the reactor was maintained at 122° F. during the 8 to 10 hour period of monomer addition. After all the monomer phase had been added, the system was allowed to remain for 3½ hours at 122° F.

Any emulsifier capable of operating in an acid medium may be used in preparing the tetrapolymer latices of the present invention. For example, the solution salts of an aryl sulfate or of a long chain alkyl or alkyl-aryl sulfonate such as sodium lauryl sulfate or sodium dodecyl benzene sulfonate are satisfactory.

Any of the conventional peroxides, persulfates or azo compounds can be utilized as initiators. Among the suitable initiators may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox initiators such as a combination of any of the peroxygen initiators mentioned above together with reducing agents such as sodium sulfite, sucrose, ferrous gluconate, etc. The amount of the catalyst may be varied over a relatively wide range; generally from about 0.1 percent to about 0.5 percent by weight of the materials to be polymerized is used.

The polymeric latices of the present invention prepared by the above-described process are characterized by an average particle size of 900 to 1400 A., a surface tension of 35 to 45 dynes/centimeter$^2$, preferably 37 to 38; a viscosity at 60 percent total solids of 20 to 80 cps. (Brookfield 1 spindle, 25° C., 60 r.p.m.). The latices may be utilized as barrier coatings over a wide range of total solids, e.g., as low as 20 percent or as high as 60 percent or higher. Latices having a higher total solids are prepared by concentrating, e.g., by vacuum distillation, a latex having a lower total solids. Generally, latices are used at about 40 to 45% and 60 to 62% total solids. Latices having a total solids of 40 to 45% exhibited good recoatability properties, less foaming tendency, and the films cast therefrom leave superior MVTR values.

Film formation of the latices of the instant invention will take place by depositing a coating of the latex on any suitable substrate and drying it in air for about two minutes at room temperature. Free films may be obtained by depositing the latex on a nonporous surface of a substrate and stripping the dried film from the substrate. If a shorter drying cycle is required, temperatures as high as about 105° C. to 120° C. may be used. It has been found, however, that if excessive drying temperatures are employed, film discoloration may occur and in some cases, blistering of the film has been observed.

Various methods or means of depositing a coating of the polymer on any suitable substrate may be used. Any type of mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater, and curtain coater. Deposition may be carried out in one or a number of applications.

Some coating methods may require an increase in the viscosity of the latex. In such case, the viscosity change may be brought about without interfering with film-forming properties by the addition of suitable thickening agents, such as sodium alginate, karaya gum, hydroxyethyl cellulose, and polyvinyl alcohol. Ordinarily, satisfactory results are obtained with less than 1 percent of the thickening agent based on the weight of the dispersed solids.

The novel vinylidene chloride copolymer films of the present invention are preferably applied from aqueous dispersions in order to provide the highest degree of the above-mentioned advantageous properties and for ease and economy of applying coatings from aqueous systems.

The novel tetrapolymers of the present invention may also be applied as coatings from solvent systems. Preferred solvents for the tetrapolymers include tetrahydrofuran and mixtures of methyl ethyl ketone and toluene. Other suitable solvents known to the art may also be used. Solvent compositions may be prepared by coagulating a latex such as the latex of Example 1 and then dissolving the thus-coagulated polymer in tetrahydrofuran. Although the concentration of the polymer may be varied over a relatively wide range, a particularly useful solution contains 15 percent polymer. Solvent compositions may also be prepared utilizing suitable solvents and tetrapolymers prepared by solvent polymerization or suspension polymerization as well as the emulsion polymerization procedure set forth above.

While the tetrapolymers of the present invention are particularly useful as coatings on packaging materials, they are also useful as packaging materials per se as free films. Free films may be prepared by casting a layer of latex on a glass surface, for example, drying, and then removing the thus-formed film. Free films may also be prepared by coagulating the polymer from the latex, washing, and then extruding the film by methods known to the art.

What is claimed is:

1. A film-forming composition for providing films having high vapor barrier characteristics and flexibility comprising an aqueous dispersion of a copolymer of about 87 to 94 weight percent of vinylidene chloride, about 4 to 7 weight percent of methyl acrylate, about 1.5 to 6 weight percent of methyl methacrylate, and about 1 to 3 weight percent of acrylonitrile.

2. A film-forming composition for providing films having high vapor barrier characteristics and flexibility comprising an aqueous dispersion of a copolymer of about 88 to 92 weight percent of vinylidene chloride, about 1.5 to 6 weight percent of methyl methacrylate, about 4 to 7 weight percent of methyl acrylate, and about 2 weight percent of acrylonitrile.

3. A novel packaging material comprising a base material coated on at least one surface with an aqueous dispersion of a copolymer of about 87 to 94 weight percent of vinylidene chloride, about 4 to 7 weight percent of methyl acrylate, about 1.5 to 6 weight percent of methyl methacrylate, and about 1 to 3 weight percent of acrylonitrile.

4. A packaging material as defined in claim 3 wherein said base material is paperboard.

5. A novel packaging material comprising a base material coated on at least one surface with an aqueous dispersion of a copolymer of about 88 to 92 weight percent of vinylidene chloride, about 1.5 to 6 weight percent of methyl methacrylate, about 4 to 7 weight percent of methyl acrylate, and about 2 weight percent of acrylonitrile.

6. The process of preparing a novel packaging material which comprises applying to at least one surface of a base material a coating of an aqueous dispersion of a film-forming copolymer of about 87 to 94 weight percent of vinylidene chloride, about 4 to 7 weight percent of methyl acrylate, about 1.5 to 6 weight percent of methyl methacrylate, and about 1 to 3 weight percent of acrylonitrile, and drying said coating.

7. The process of preparing a novel packaging material which comprises applying to at least one surface of a base material a coating of an aqueous dispersion of a film-forming copolymer of about 88 to 92 weight percent of vinylidene chloride, about 2 to 5 weight percent of methyl methacrylate, about 4 to 7 weight percent of methyl acrylate, and about 2 weight percent of acrylonitrile, and drying said coating.

8. A novel polymer comprising about 87 to 94 weight percent vinylidene chloride, about 4 to 7 weight percent methyl acrylate, about 1.5 to 6 weight percent of methyl methacrylate and about 1 to 3 weight percent acrylonitrile.

9. A free film comprising a copolymer of about 80 to 94 weight percent vinylidene chloride, about 1.5 to 15 weight percent methyl acrylate, about 1.5 to 15 weight percent of methyl methacrylate and about 1 to 10 weight percent acrylonitrile.

References Cited by the Examiner
UNITED STATES PATENTS

| | | | |
|---|---|---|---|
| 2,720,511 | 11/1955 | Cupery et al. | 260—32.8 |
| 3,097,178 | 7/1963 | Townsend et al. | 260—29.6 |
| 3,111,507 | 11/1963 | Watt | 260—80.5 |
| 3,226,370 | 12/1965 | Poindexter | 260—80.5 |

SAMUEL H. BLECH, *Primary Examiner.*

J. ZIEGLER, *Assistant Examiner.*